March 18, 1941.  W. V. HUKILL  2,235,748
METHOD OF DRYING GRAIN
Filed July 14, 1938

Inventor
W. V. HUKILL
By [signature]
Attorney

Patented Mar. 18, 1941

2,235,748

UNITED STATES PATENT OFFICE 2,235,748

METHOD OF DRYING GRAIN

William V. Hukill, Arlington, Va.; dedicated to the free use of the People in the territory of the United States Application July 14, 1938, Serial No. 219,273

5 Claims. (Cl. 34—24)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

My invention relates to a process for the drying of grains. It is well known that the moisture content of grain varies over a considerable range and that grain of relatively high moisture content is unstable as to condition and, when stored in any considerable bulk tends to become self-heating, either through rapid development of fungi or through metabolic processes occurring within the grain kernels themselves, to an extent which frequently results in either reduction of grade or even complete spoilage and loss of the grain unless the grain can be either cooled or dried before the deterioration assumes serious proportions. Various methods and apparatus have been employed for drying grain, which however are under the serious disadvantage that the rate of moisture removal from the grain is necessarily slow and apparatus capable of drying grain in practicable quantities is unavoidably so large and costly as to render it impracticable for use on farms where relatively small quantities of grain are handled or stored.

I overcome these objections by means of a new and useful method of drying moist grain by which grain having a moisture content of such amount as to render the grain unstable in bulk storage, may be dried to a moisture content at which the grain will be stable, at a rate of moisture removal far exceeding that which has been possible under methods of drying heretofore employed. I accomplish this important result by means of the method hereinafter described.

Investigations by the Department of Agriculture and others of the equilibrium moisture content of grains, at different atmospheric temperatures and relative humidities have shown that with grain and air in temperature and moisture equilibrium, the moisture content of the grain appears to be dependent almost entirely upon the relative humidity of the air and the relation between the moisture content and relative humidity is very little affected by the temperature of grain and air, and that grain, exposed to air of a given relative humidity will not only come to temperature equilibrium with the air but will also come to a condition of moisture equilibrium by taking up or giving off to the air such amount of moisture as may be necessary, indicating that at the temperature-moisture equilibrium condition the vapor pressure of the moisture in the grain is substantially equal to the vapor pressures of the moisture in the air at the given relative humidity. The condition of temperature-moisture equilibrium of moist grain with air is that condition in which with equal temperatures of grain and air there is no increase or decrease of moisture content of the grain. With grain of any given condition of temperature and moisture content, the vapor pressure of the moisture in the grain is equal to the vapor pressure of moisture in air of the same temperature and of the relative humidity at which the grain and air would be in moisture equilibrium, and this vapor pressure is, therefore, readily determined by reference to a standard psychrometric chart or table. The moisture content of the grain to be dried can be determined in a number of ways but for the successful operation of my invention it is not necessary to know the exact moisture content of the grain to be dried.

I have found that by heating grain containing moisture to a temperature, for example 130° F., such that the wheat will not be injured by overheating but high enough that the vapor pressure of the grain is substantialy higher than the vapor pressure of the moisture in air available for drying, and immediately subjecting the heated grain to a current of such air, that evaporation of moisture from the grain will take place at such a rate that the moisture content of the grain is reduced more rapidly than by processes hitherto employed.

Apparatus which can be used for carrying out the drying process which I have invented is shown in the accompanying drawing, in which Fig. 1 is an elevation of an apparatus which can be used for heating grain by conducted heat, the while continuously agitating the grain.

Figure 5:
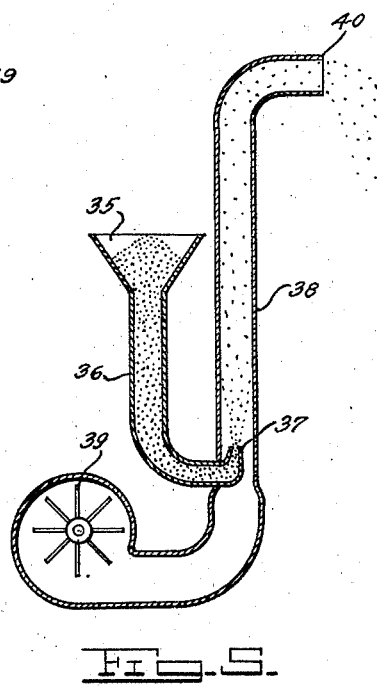

Fig. 5 is a vertical section of a drying chamber which may be used for carrying out still another application of the process which I have invented, in which chamber heated grain is subjected to the action of an upwardly directed current of air moving at a velocity sufficient to carry the grain in suspension and raise it to an elevated point, at which point the grain is discharged into and allowed to fall freely through the open air.

Similar numerals refer to similar parts throughout the several views.

Figure 1:
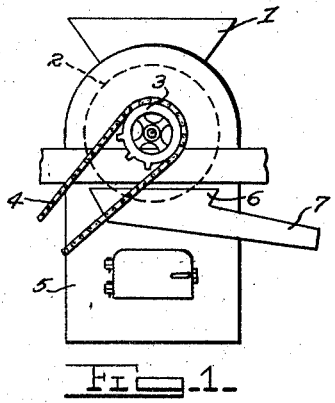

In the heating apparatus shown in Fig. 1, grain is received in a hopper 1 which delivers the grain to the distant end of a revolving cylinder 2 which forms the heating chamber. Cylinder 2 is rotated by any suitable means such as the sprocket 3 and chain 4 which receives its motion from a source not shown. Cylinder 2 is heated by suitable means such as the furnace 5. Grain traversing the cylinder 2 and heated therein by heat conducted through the walls of said cylinder while being constantly agitated by rotation of the cylinder is discharged into the hopper 6 from which the inclined chute 7 delivers the heated grain to a suitable drying chamber such as one of those shown in Figs. 3, 4, and 5, and therein subjected to the action of a current of air as hereinafter described.

Figure 2:
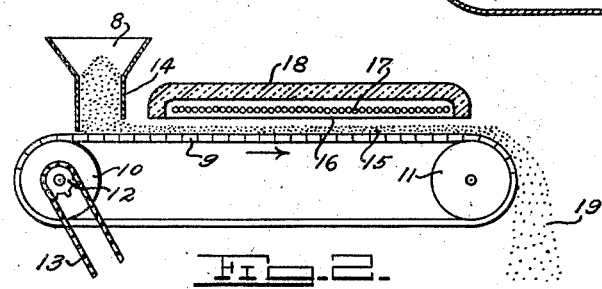
Fig. 2 is a vertical section of an apparatus which can be used for heating grain by radiant heat under an alternative application of my invention.

In the heating apparatus shown in Fig. 2, the moist grain to be dried is received in a hopper 8 the open lower end of which is positioned close to, but not in contact with, the upper surface of an apron conveyor 9 carried on drums 10 and 11, one of which as 10 is rotated by suitable means such as the sprocket 12 and chain 13 which receives its motion from a source not shown and moves conveyor 9 in the direction indicated by the arrow adjacent to same. On the side 14 of the hopper 8 toward which the conveyor 9 moves, the lower end of the hopper 8 is positioned at such a height above the conveyor 9 as to permit a thin layer 15 of grain to be moved forward on the conveyor and carried under a heating element 16 positioned above and in proximity to the conveyor 9. Heating element 16 is maintained at a high temperature by suitable means such as a grid 17 of electrically heated wires and insulated by heat-insulating material 18, the temperature of the heating element 16 being such as to cause heat to be radiated at a high rate of heat transfer upon the thin layer 15 of grain, the grain being thereby rapidly heated. The heated grain is discharged at 19 to a suitable drying chamber such as one of those shown in Figs. 3, 4, and 5, wherein the heated grain is subjected to the action of a current of air as hereinafter described.

Figure 3:
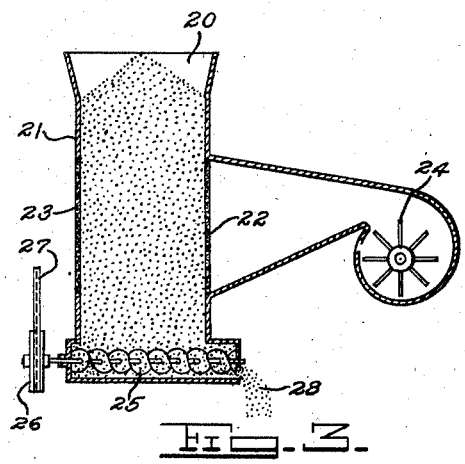
Fig. 3 is a vertical section of a drying chamber in which grain previously heated to a suitable temperature may be subjected to the action of a current of air passed forcibly through the heated grain from one side of said chamber to an opposite side of the same.

In the drying chamber shown in Fig. 3, moist grain heated by conducted heat through means such as are shown in Fig. 1 or by radiant heat through means such as are shown in Fig. 2, is delivered into a hopper 20 at the top of a drying chamber 21. The heated grain settles slowly through drying chamber 21 and passes between screen surfaces 22 and 23, which surfaces form opposite sides of said chamber, and is there subjected to the action of currents of air drawn from the atmosphere and forcibly passed through the grain by suitable means, such as a fan 24, whereby the grain is dried and cooled, the dried grain being removed from the bottom of the chamber at a controlled rate by suitable means, such as a spiral conveyor 25 actuated by suitable driving means, such as a sprocket 26 and chain 27 receiving its motion from a source not shown, the dried grain being discharged at 28.

Figure 4:
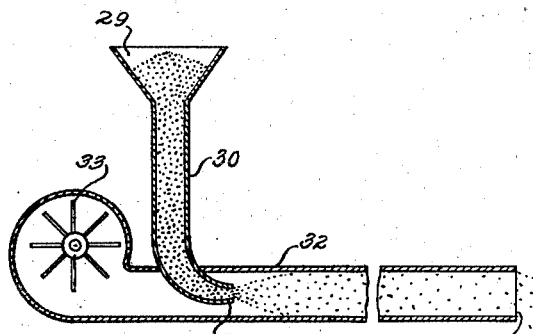
Fig. 4 is a vertical section of an alternative form of drying chamber in which heated grain may be subjected to the action of a current of air passed through said chamber at such velocity as to carry the heated grain in suspension in said current.

In the drying chamber shown in Fig. 4, moist grain heated by suitable heating apparatus such as one of those shown in Figs. 1 and 2, is received from said apparatus in a hopper 29 from which it descends by gravity through a pipe 30 and a nozzle 31 into the air pipe 32 wherein the grain is subjected to the action of a current of air drawn from the atmosphere and forced through said air pipe by suitable means such as a fan 33, at such a velocity as to carry the grain in suspension therein, the grain being thereby dried and the dried grain discharged at the distant end 34 of the air pipe.

In the drying chamber shown in Fig. 5, moist grain, heated by a suitable heating apparatus such as one of those shown in Figs. 1 and 2, is received in a hopper 35 from which it descends by gravity through a pipe 36 and a nozzle 37 into an air pipe 38 and is there subjected to an upwardly directed current of air drawn from the atmosphere and forced through said air pipe by suitable means, such as a fan 39, at such a velocity as to carry the grain upward in suspension therein, the grain being thereby partly dried and raised to an elevated point 40 and there discharged into the open air and permitted to fall freely through the air and thereby become further dried.

Under one application of my method, I may heat the grain by disposing it in contact with heated surfaces in a heating chamber, and continuously stir or agitate the grain while it is being heated in order to permit heating to be done quickly and to ensure uniformity of heating and avoid burning or local over-heating of the grain; after which I transfer the heated grain from the heating chamber to a drying chamber and forcibly pass a current of air through the heated grain in the drying chamber, from the one side or end of the chamber to the other side or end of the same. Said drying chamber may have two opposite sides of screen or other open mesh material, spaced a few inches apart and be so arranged that the wheat will move slowly from one end to the other, the while air is forcibly passed in one screened side and out the other.

Under an alternative application of the method of grain drying which I have invented, I may dispose the grain to be dried in a thin layer of substantially uniform thickness and pass the layer of grain beneath and in close proximity to heating surfaces, but not in contact therewith, and heat the grain by radiant heat emitted from said heating surfaces, after which I transfer the heated grain to a drying chamber and forcibly pass a current of air through the grain as hereinabove described.

With either method of heating the grain, described above, I prefer to transfer the heated grain to a drying chamber adapted to permit air under pressure to enter the chamber on one side thereof and to pass out on the side opposite thereby drying the grain, but it is evident that a similar air current passed through the grain by suction or induction would serve a similar purpose, without departing from the essential principle of my invention.

Under still another application of my invention, I may heat the grain by either of the aforementioned methods and transfer the heated grain to a drying chamber through which chamber a current of air is passed at such velocity as to carry the heated grain in suspension in the air current and thereby provide for complete exposure of the entire surface of each individual kernel of the grain to the drying action of the air current and making possible a very rapid reduction in the moisture content of the grain.

Under still another application of my invention, I may heat the grain by either of the aforementioned methods and transfer the heated grain to a drying chamber through which is passed a current of air at sufficient velocity to carry the heated grain in suspension and direct said air current in an upward direction whereby said grain is simultaneously dried and raised to an elevated point, at which point I may discharge the grain into the open air and permit the grain to fall freely into a receptacle below. The grain is thereby partly dried in the current of air in the drying chamber and is further dried during its free fall through the open air, after being discharged at said elevated point.

Powers (Patent 112,628, March, 1871) used "heat for expelling the water" from a material and "a gentle blast of air" whereby "moisture adhering to it by reason of the partial condensation of the water ... will be dried away." In my invention conducted or radiated heat is used to raise the temperature of the grain to such a degree that the vapor pressure is higher than that of air available for drying, thereupon air is passed forcibly through the wheat or the wheat is carried in suspension by air, accomplishing rapid drying of the heated wheat. I am aware that, prior to my invention, heat and air circulation have been employed in various ways for the drying of grain. I therefore do not claim such use broadly, but rather the use of heat as hereinabove described followed by the use of forcibly circulated air as hereinabove described.

It is to be further understood that my invention may be practiced by the use of any standard equipment, and that no particular apparatus not already in commercial use has to be employed, or constructed. It is the object and purpose of my invention that I may use apparatus of standard construction.

Having thus described my invention, what I claim for Letters Patent is:

1. A process for drying grain, comprising subjecting grain to the action of conducted heat, the while continuously agitating the grain, in contact with heated surfaces until the grain becomes heated to a temperature sufficient that the vapor pressure of the moisture in the grain is substantially higher than the vapor pressure of the moisture in the atmospheric unheated air available for drying the grain; then transferring said heated grain and subjecting it to the action of currents of said air at such velocity as to carry the grain in suspension; and thence recovering the grain.

2. A process for drying grain, comprising subjecting grain to the action of conducted heat, the while continuously agitating the grain, in contact with heated surfaces until the grain becomes heated to a temperature such that the vapor pressure of the moisture in the grain is substantially higher than the vapor pressure of the moisture in the atmospheric unheated air available for drying the grain; thence subjecting said grain to an upwardly directed current of said air moving at such velocity that said grain is carried in suspension therein, and thereby partly dried and raised to an elevated point and discharged into the open air, and permitted to fall freely through the air, and thereby become further dried.

3. A process for drying grain, comprising disposing grain in a relatively thin layer of substantially uniform thickness; thence moving the layer of grain beneath heating surfaces, disposed in substantially close proximity to the upper surface of said grain but not in contact therewith, the while subjecting said grain to radiant heat for a time sufficient to heat it to a temperature such that the vapor pressure of the moisture in the grain is substantially higher than that of the moisture in the atmospheric unheated air available for drying; thence transferring said heated grain and forcibly passing through the grain, currents of said air.

4. A process for drying grain, comprising disposing grain in a relatively thin layer of substantially uniform thickness; thence moving the layer of grain beneath heating surfaces, disposed in substantially close proximity to the upper surface of said grain but not in contact therewith, the while subjecting said grain to radiant heat for a time sufficient to heat it to a temperature such that the vapor pressure of the moisture in the grain is substantially higher than that of the moisture in the atmospheric unheated air available for drying; then transferring said heated grain and subjecting it to the action of currents of said air at such velocity as to carry the grain in suspension; and thence recovering the grain.

5. A process for drying grain, comprising disposing grain in a relatively thin layer of substantially uniform thickness; thence moving the layer of grain beneath heating surfaces, disposed in substantially close proximity to the upper surface of said grain but not in contact therewith, the while subjecting said grain to radiant heat for a time sufficient to heat it to a temperature such that the vapor pressure of the moisture in the grain is substantially higher than that of the moisture in the atmospheric unheated air available for drying; thence subjecting said grain to an upwardly directed current of said air moving at such velocity that said grain is carried in suspension therein, and thereby partly dried and raised to an elevated point and discharged into the open air, and permitted to fall freely through the air, and thereby become further dried.

WILLIAM V. HUKILL.